July 10, 1956  G. W. LINDSAY  2,753,884
FUEL FILLING ADAPTER
Filed Jan. 26, 1953  3 Sheets-Sheet 1

INVENTOR.
GRIFFITH W. LINDSAY
BY
ATTORNEY

July 10, 1956 G. W. LINDSAY 2,753,884
FUEL FILLING ADAPTER
Filed Jan. 26, 1953 3 Sheets-Sheet 2

INVENTOR.
GRIFFITH W. LINDSAY
BY *Toulmin & Toulmin*
ATTORNEYS

INVENTOR.
GRIFFITH W. LINDSAY
BY
ATTORNEYS

United States Patent Office 2,753,884
Patented July 10, 1956

2,753,884

FUEL FILLING ADAPTER

Griffith W. Lindsay, Dayton, Ohio, assignor to Buckeye Iron & Brass Works, Dayton, Ohio, a corporation of Ohio Application January 26, 1953, Serial No. 333,042

1 Claim. (Cl. 137—322)

This invention relates to fuel filling adapters, particularly to adapters for attaching fuel nozzles to relatively large storage and supply tanks such as those of aircraft, diesel locomotives, tank trucks, power boats, and the like.

A fuel nozzle of the particular nature for which the present adapter was developed was illustrated and described in my co-pending application, Serial No. 333,041, filed January 26, 1953 now Patent No. 2,737,401.

Most aircraft are provided with adapter fittings on their fuel tanks, to which a fuel nozzle is connected for quickly supplying fuel to the tanks. In the past there have been problems in connection with the standardization of the nozzles and adapters, in effectiveness of the seals between the nozzles and adapters, difficulty of making the connection of the nozzle to the adapter, and the loss of pressure of the fuel in passing through the nozzle and adapter.

With the foregoing in mind, the fuel nozzle of my co-pending application referred to above and the adapter which forms the subject matter of the instant application were developed with the foremost objective in view of eliminating the difficulties referred to above.

One object of this invention is the provision of an adapter for receiving a fuel nozzle which is standardized.

A particular object of the present invention is the provision of an adapter of the nature described so constructed that a minimum loss of pressure obtains during the passage of fuel therethrough, whereby filling of the fuel tank to which the adapter is connected can be accomplished in the shortest possible time and with a minimum amount of pressure.

Another particular object of this invention is the provision of an adapter member having a valve member normally closing the adapter which will provide a positive seal of the adapter under all conditions.

A still further object of this invention is the provision of an adapter of the nature described having normally closed members constructed and arranged so that the connection of a fuel nozzle thereto and operation of the fuel nozzle into open position will bring about opening of the adapter valve member.

Still another object is the provision of an adapter having a valve member for closing the adapter and which valve member substantially prevents any loss of fluid from the adapter when the fuel nozzle is disconnected therefrom.

These and other objects will become more apparent upon reference to the following descriptions taken in connection with the accompanying drawings, in which.

Figure 1:
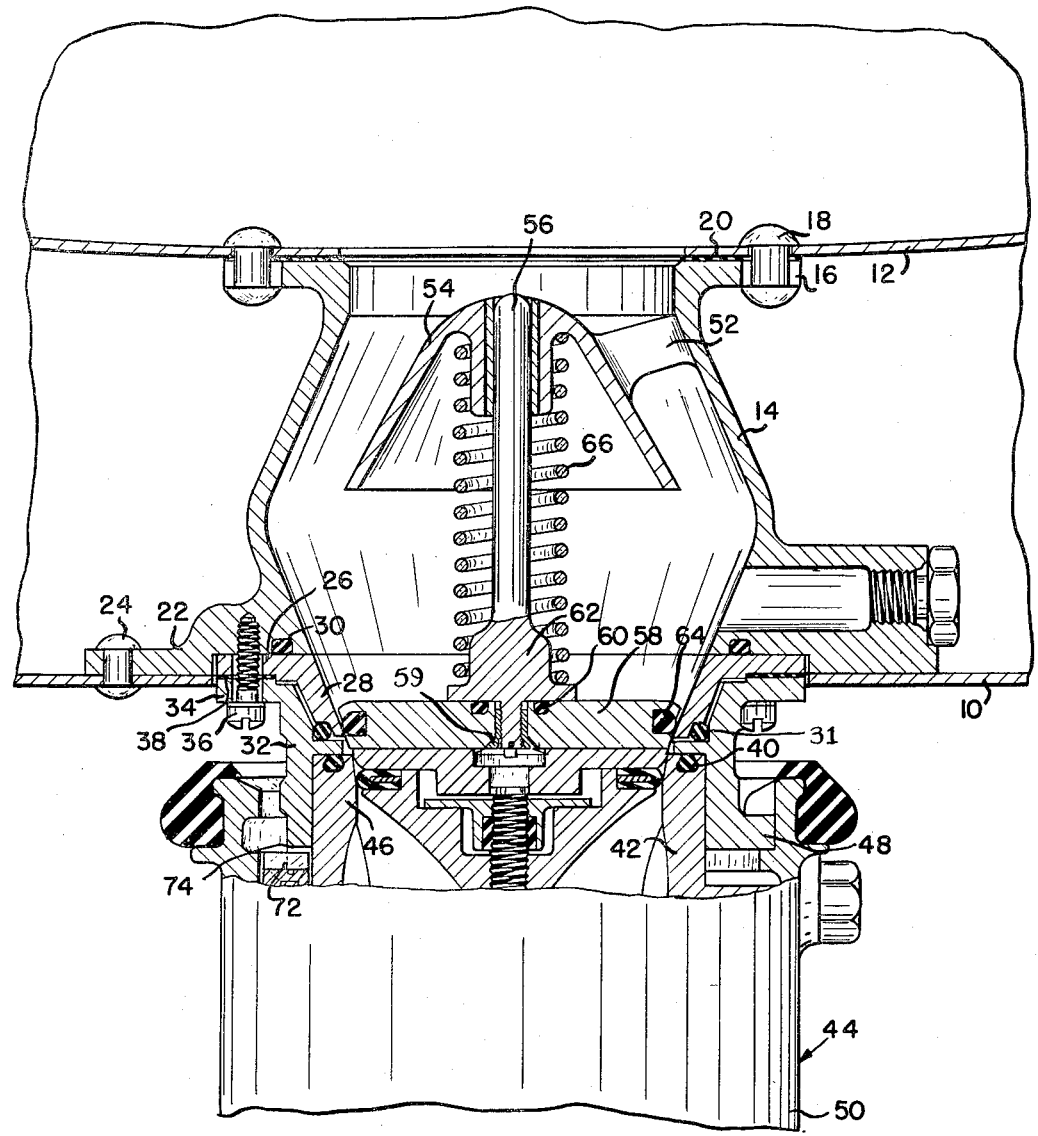
Figure 1 is a sectional view through an adapter according to my invention, with a fuel nozzle attached to the adapter and with the nozzle and adapter both closed.

Referring to the drawings somewhat more in detail, the adapter, according to my invention, is adapted for being mounted directly on a tank to be filled and for being mounted in the wing or the fuselage of an aircraft so as to be substantially flush therewith and to be located in a convenient position for servicing the aircraft. The adapter is also adapted for connection with the other end of a rigid and flexible conduit should it be necessary to make a connection to the tank in this manner.

The adapter, as illustrated in the drawings, is mounted in the underside of the wing of an aircraft with the outer skin of the wing being indicated at 10 and the tank which the adapter supplies being indicated at 12. The adapter comprises a body 14 having a flange 16 at one end that is availed of for securing the adapter body to tank 12 as by the rivets 18. Gaskets 20 prevent leakage where the adapter is connected with the tank.

The lower end of body 14 also comprises a flange 22 that is secured to wing 10 by rivets 24.

The lower face of body 14 has a recess in which is disposed flange 26 of the frusto conical element 28 forming a part of the adapter body. An annular resilient O ring 30 in a groove within the recess forms a fluid-tight seal between body 14 and member 28 while O ring 31 seals between member 28 and an adapter ring 32.

Fitting about frusto conical member 28 is an adapter ring 32 likewise having a flange 34 that is contiguous with flange 26. Screws 36 extend through flanges 26 and 34 and retain adapter member 32 and member 28 in assembled position on adapter body 14. A gasket 38 may be provided between flanges 26 and 34 to prevent leakage from between members 28 and 32.

Adapter member 32 has an inwardly projecting rib 40 thereon which is adapted for engaging the upper end of valve sleeve 42 of the fuel filling nozzle generally indicated at 44. The upper end of valve sleeve 42 contains the seal ring 46 which effects a fluid-tight seal between the valve sleeve and the adapter member 32.

Figure 5:
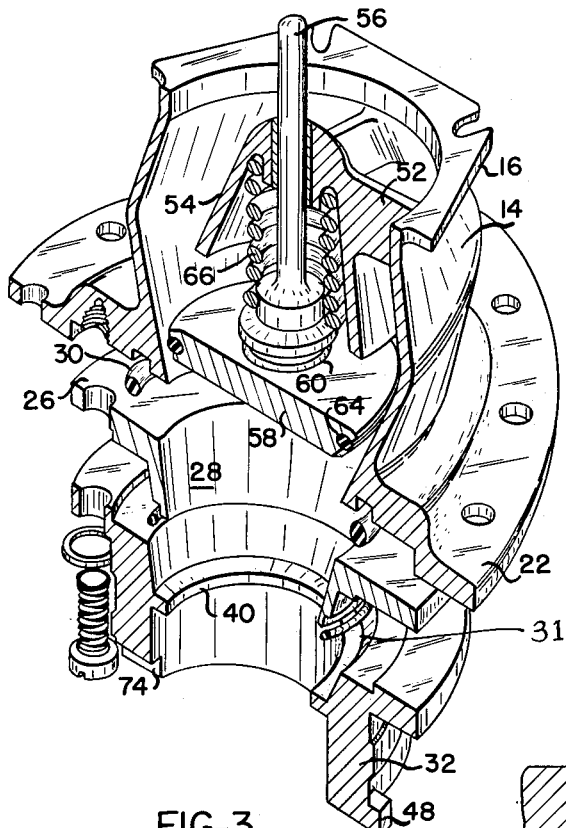
Figure 5 is an exploded perspective view showing the several parts making up the adapter according to the present invention.
Figure 4:
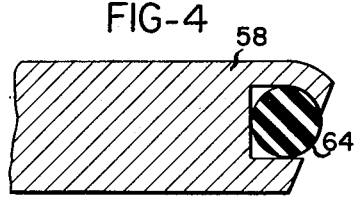
Figure 4 is a fragmentary view illustrating the manner in which the valve member of the adapter is constructed.
Figure 3:
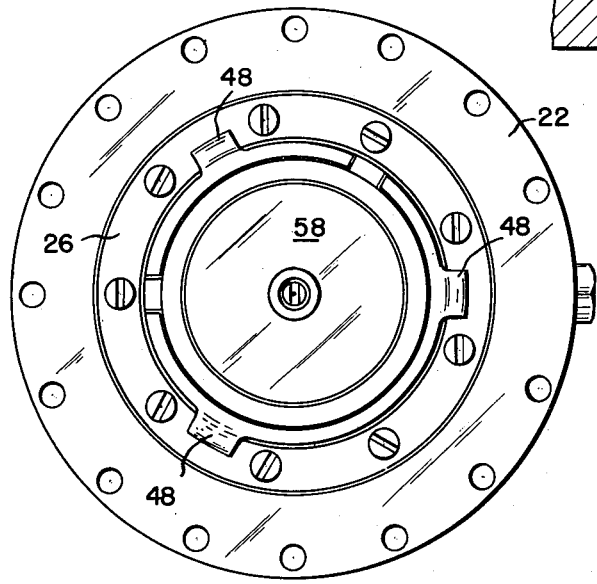
Figure 3 is a view looking up from beneath the adapter showing the lugs provided thereon which detachably engage the fuel nozzle.

Adapter member 32 extends downwardly from rib 40 and at its lower end has the radially projecting lugs 48, best seen in Figures 3 and 5, which enter slots spaced about the periphery of the upper end of body 50 of the fuel filling nozzle so that after the nozzle is brought into position relative to the adapter, rotation of the body of the nozzle will cause it to become detachably connected with the adapter.

The body of the adapter is in the general form of two frusto conical elements arranged with their larger bases together so that the largest diameter of the adapter body is in about the center thereof with the body tapering inwardly toward its opposite ends.

Supported within the upper end of the adapter body, as by the ribs 52, is a tapering member 54 having means for slidably receiving a valve stem 56 that is flanged at the bottom and has a threaded projection extending through a disc 58 forming the valve member for the adapter. A nut 59 on the threaded projection holds the disc in place. The annular seal ring 60 between the lower end of stem 56 and the disc provides means for preventing fluid leakage between the stem and valve disc which might escape along the screws 62 that clamp the disc 58 to the stem.

The outer periphery of disc 58 is arranged to engage the inner periphery of frusto conical member 28 in sealing metal to metal contact. The outer periphery of disc 58 is also grooved to receive the resilient annuar ring 64 which is of rubber-like material and which also engages the inner surface of member 28 in sealing relation.

It will be appreciated that the valve member of the adapter effects a substantially positive seal due to the combination of the metal to metal contact between the valve member and adapter body and by further reason of the resilient seal ring 64 which engages the adapter body. The metal to metal contact between the valve member and adapter body not only effects a seal therebetween but also rotates the valve member and guides it into proper position for the ring 64 to be most effective.

A compression spring 66 is provided that urges the valve member toward closing position and which will yield when the valve member is moved upwardly to its open position.

Figure 2:
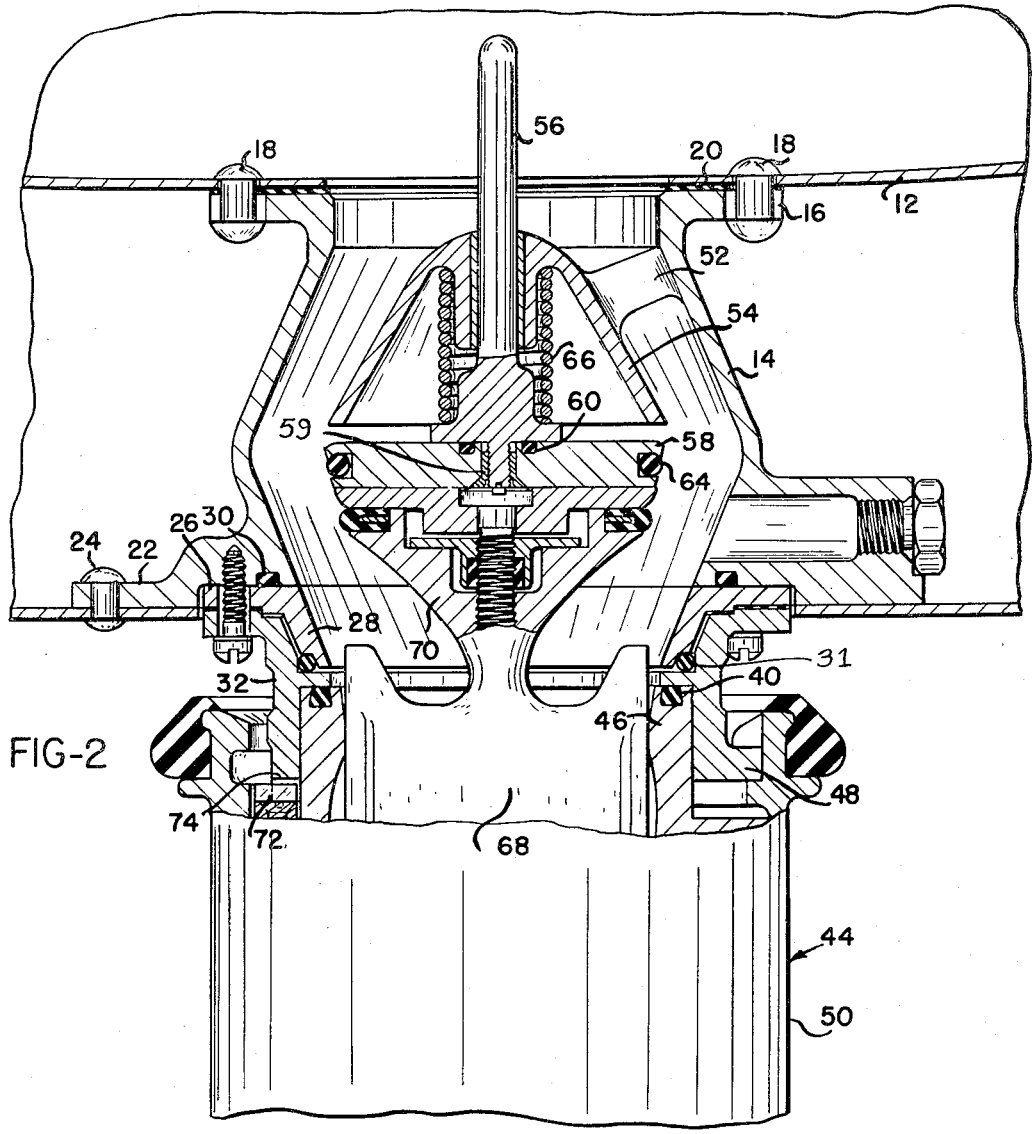
Figure 2 is a view like Figure 1 but shows the valve members of the nozzle and adapter in open position.

Turning now to Figure 2, in this figure the body 50 of the fuel filling nozzle has been rotated from its Figure 1 position and the construction of the nozzle is such that this rotation of the body thereof will cause the valve member 68 of the nozzle to move upwardly thereby to open the nozzle to permit the flow of fluid therethrough. Inasmuch as the connection of the nozzle to the adapter brought the valve member of the nozzle substantially in face to face engagement with the valve member of the adapter, the described opening movement of the nozzle valve member also brings about opening of the valve member of the adapter. The valve members are shown in their open position in Figure 2.

It will be appreciated that the configuration of the body of the adapter, together with the conical portion 70 of the valve member 68 of the nozzle, provide for a substantially streamlined flow of fluid through the adapter so that a minimum loss of pressure is experienced. This permits fuel to be delivered into tank 12 at minimum pressure and likewise there is a minimum amount of turbulence set up in the fuel whereby a minimum amount of gasing of the fuel is had. The element 28, in providing for a gradual change in the cross-sectional area of the flow passage, contributes materially to the reduction in pressure loss and turbulence.

It will also be apparent that the closing of the fuel member 68 of the fuel nozzle will permit closing of the valve member of the adapter, and with the two valve members being in face to face engagement, there will be a minimum amount of fluid that will be lost when the nozzle is disconnected from the adapter. This not only represents an economy but also prevents a fire and explosion hazard from arising.

In connection with the rotation of the body of the nozzle in order to open the fuel nozzle and adapter, the sleeve 42 of the nozzle is prevented from rotating by the element 72 mounted thereon which comprises an upstanding lug extending into a notch 74 extending axially into the lower rim of adapter member 32.

The provision of notch 74, which is fixedly located circumferentially relative to the lugs 48, prevents the connection of the fuel nozzle to the adapter in any position of the nozzle except its fully closed position, and also prevents disconnection of the nozzle from the adapter except when the nozzle is in its fully closed position.

It will be understood that this invention is susceptible to modification in order to adapt it to different usages and conditions, and, accordingly, it is desired to comprehend such modifications within this invention as may fall within the scope of the appended claim.

I claim:

An adapter fitting for tanks to which a nozzle may be connected for supplying fluid thereto, said adapter fitting comprising a reversed conical-shaped housing having inlet and outlet openings of substantially equal cross-sectional areas, the outer walls of said housing being flared outwardly from said inlet and outlet openings at equal angles to the longitudinal axis of the housing forming a middle section of larger diameter than said inlet and outlet openings, an inverted tapered stationary cup member fixedly mounted within said housing in the uppermost part thereof and having its outer walls spaced from but substantially parallel with the inner walls of the upper conical half of said housing, said stationary cup having its apex terminating in the outlet opening and spaced substantially equidistant from the walls of the outlet opening, said apex being spaced inwardly from said outlet opening, a lower reciprocable valve member cooperating with said stationary cup member, a guide pin carried by said reciprocable valve member, said guide pin being slidably carried by said stationary cup, a frusto-conical member forming a valve seat and disposed at the entrance to the reverse conical housing, and a coil spring arranged inside said stationary cup and urging said valve member to its seat, said reciprocable valve member being adapted to cooperate with a nozzle head to define a streamlined passage for fluid about said reciprocable valve member and tapered stationary cup member when said valve member is open.

References Cited in the file of this patent

UNITED STATES PATENTS

| Number | Name | Date |
| --- | --- | --- |
| 2,384,628 | Krone | Sept. 11, 1945 |
| 2,543,589 | Newcomb | Feb. 27, 1951 |
| 2,548,368 | Hartley | Apr. 10, 1951 |
| 2,574,022 | Dahl | Nov. 6, 1951 |
| 2,630,822 | Davies | Mar. 10, 1953 |
| 2,679,407 | Badger | May 25, 1954 |
| 2,729,471 | Fraser | Jan. 3, 1956 |

FOREIGN PATENTS

| Number | Country | Date |
| --- | --- | --- |
| 328,835 | Great Britain | 1930 |